Feb. 23, 1954 W. J. DOBKIN 2,670,069
APPARATUS FOR LUBRICATING CONVEYER BELTS
Filed Nov. 17, 1949 3 Sheets-Sheet 1
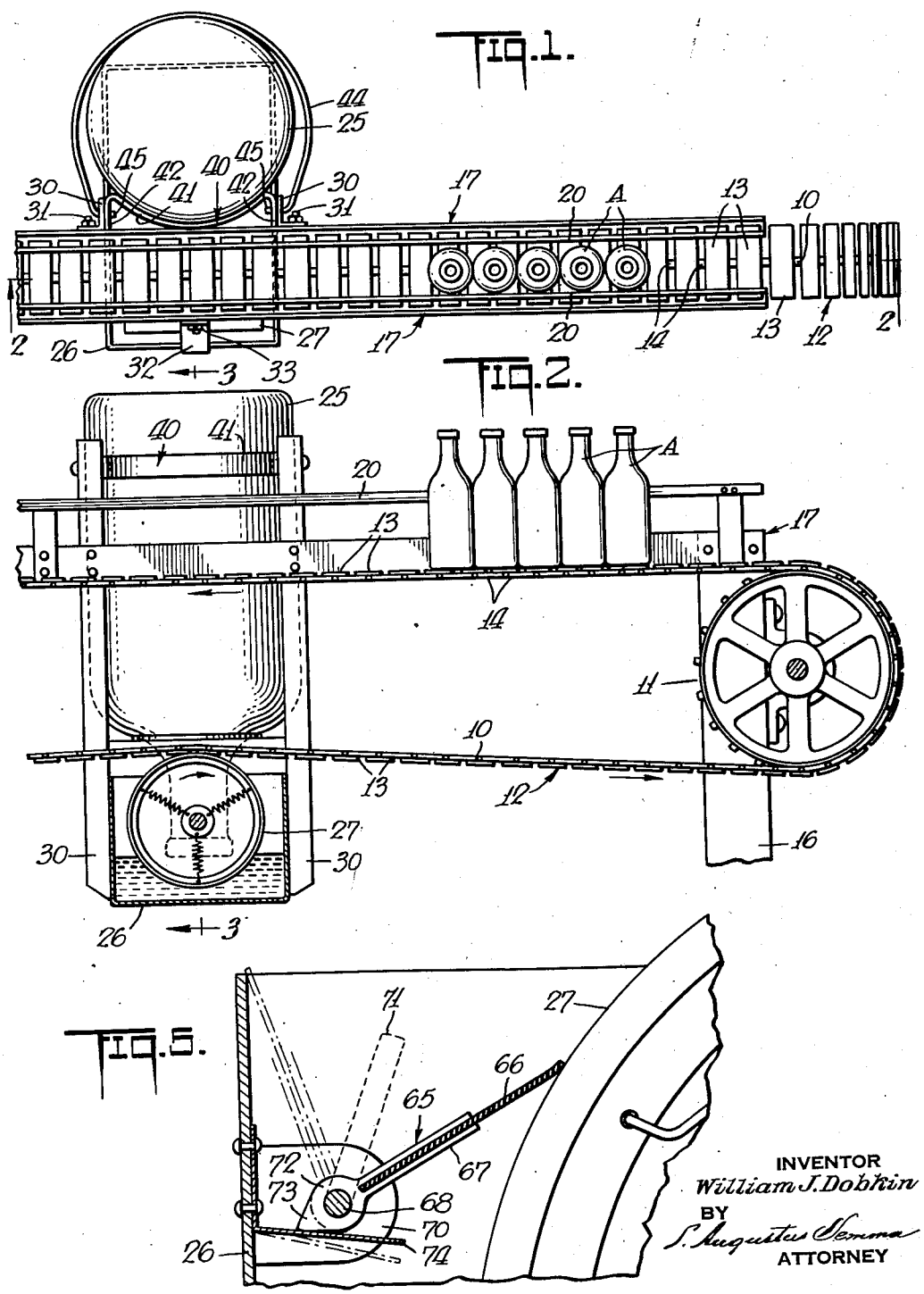

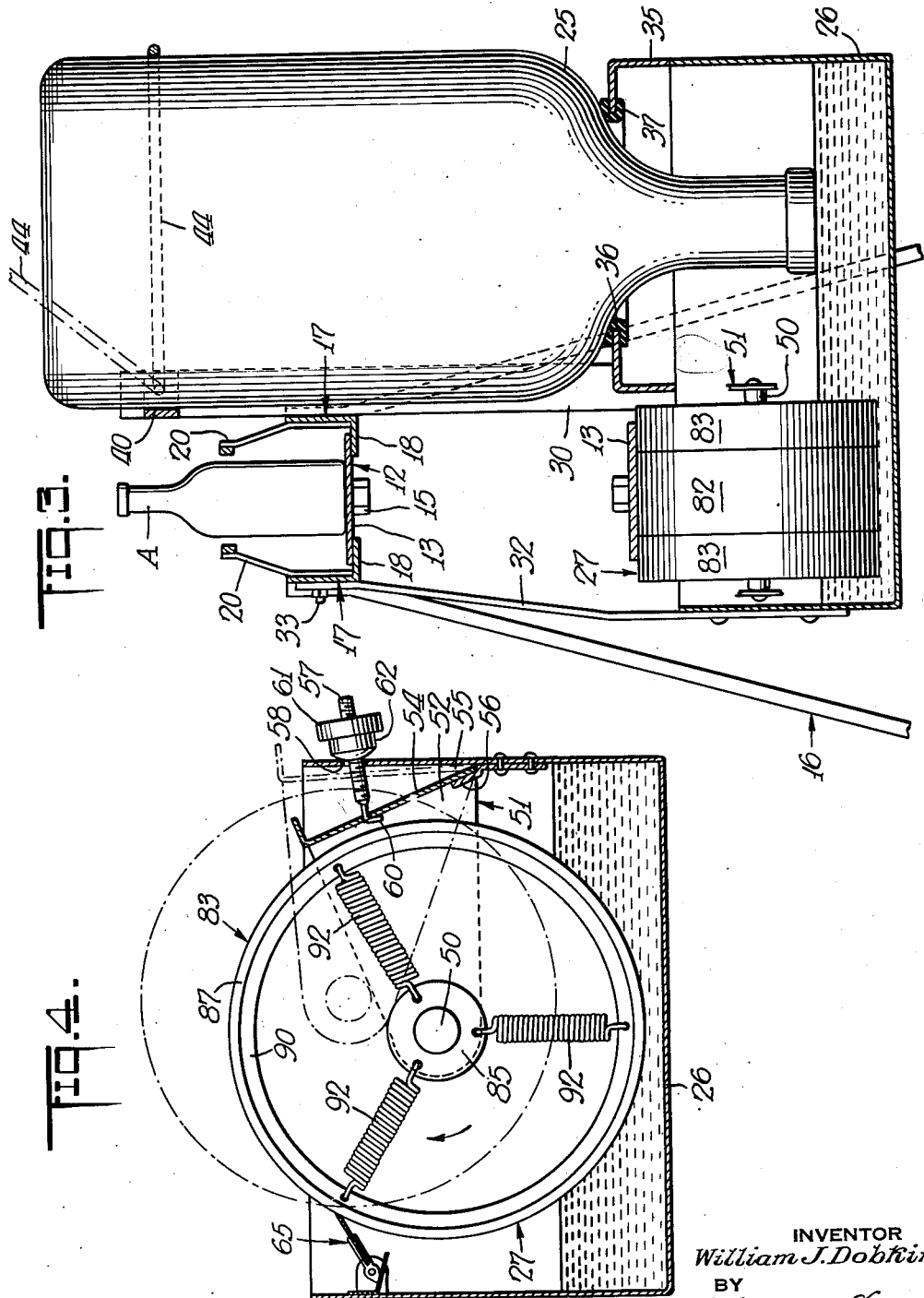

Feb. 23, 1954 W. J. DOBKIN 2,670,069
APPARATUS FOR LUBRICATING CONVEYER BELTS
Filed Nov. 17, 1949 3 Sheets-Sheet 3
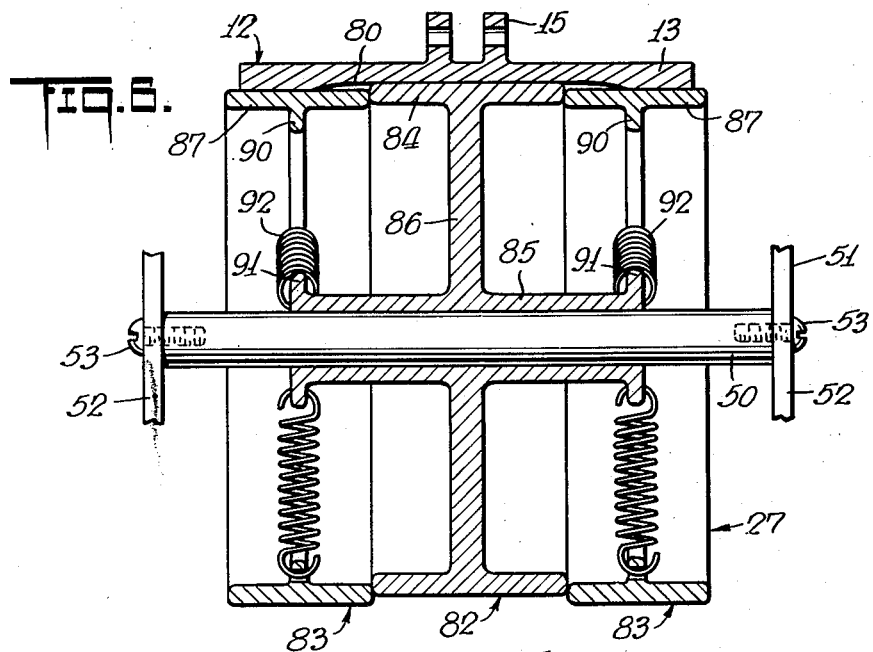
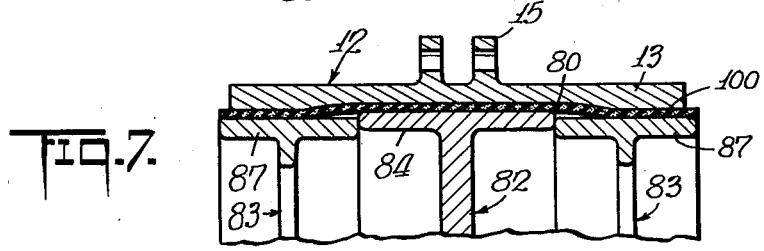
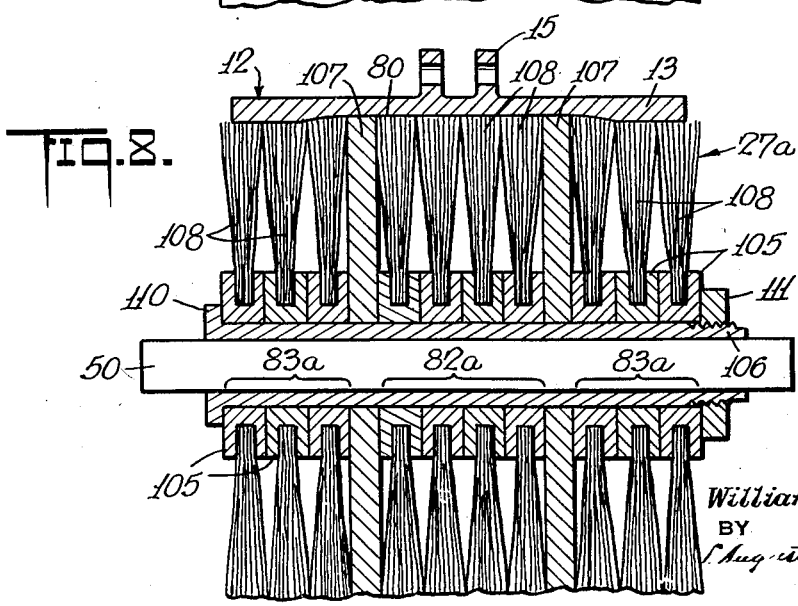
INVENTOR
William J. Dobkin
BY
ATTORNEY Patented Feb. 23, 1954

2,670,069

UNITED STATES PATENT OFFICE 2,670,069

APPARATUS FOR LUBRICATING CONVEYER BELTS

William J. Dobkin, Jackson Heights, N. Y.

Application November 17, 1949, Serial No. 127,871

13 Claims. (Cl. 198—1)

The present invention relates to apparatus for lubricating a conveyor belt, such as is used in transporting bottles, cans and similar articles in connection with mechanical handling operations.

In some forms of handling devices, articles such as bottles, cans, etc. are moved along in streams by a conveyor belt from station to station where different operations on these articles are performed, such as filling, capping, labeling, packaging, etc. This belt may be of the articulated type with an endless sprocket chain attached to carrying elements in the form of metal slats and with the upper flight or run of the belt supported on side tracks or runways against the weight of the articles thereon.

During some of the handling operations described, the movement of the conveyed articles is interrupted, while the conveyor belt continues its movement. As a result, the conveyor belt rides past the interrupted articles being operated upon, thereby subjecting the belt to abrasive wear, especially along its longitudinal center upon which the articles repose. Lubrication of the conveyor belt is, therefore, necessary to render the belt smooth and slippery and to minimize its wear resulting from the conditions described. Even with the application of a lubricant on the belt, a channel is eventually worn along the longitudinal medial part of the belt on which the bottles or other articles handled rest.

In one known method of lubricating the belt, a wet cake of soap is supported over the upper run of the belt near its starting section. As the belt rides past this cake of soap, it rubs off some of the soap and is lubricated thereby. The amount of soap removed by the belt by this process cannot be easily controlled or adjusted. Moreover, lubrication tends to be limited to localized areas of the belt, especially if the surface of said belt is irregular on account of abrasive wear or for any other reason, thereby leaving other parts of the belt requiring lubrication free from such lubrication.

Another known method comprises dripping liquid soap from a container over the upper run of the belt. Here again the method is unreliable, since it is not susceptible of accurate control and adjustment, makes the lubricant difficult to spread evenly over the surface of the belt and tends to effect excess lubrication, if for example, there is an interruption in the operation of the belt.

One object of the present invention is to provide a new and improved conveyor belt lubricating apparatus which can be readily attached to existing conveyor systems.

A further object is to provide a new and improved conveyor belt lubricating apparatus adapted to dispense liquid lubricant only while the conveyor is in operation.

A further object is to provide a new and improved conveyor belt lubricating apparatus which lends itself to accurate control and adjustment of the amount of lubricant applied to the belt.

A further object is to provide a new and improved apparatus for applying lubricant substantially evenly across the belt, irrespective of any abrasive wear or any other irregularity in the supporting surface of said belt.

A further object is to provide a belt lubricating apparatus which in spite of its many features is nevertheless comparatively simple and inexpensive to manufacture and reliable in operation.

Various other objects are apparent from the following particular description and from an inspection of the accompanying drawings, in which:

Fig. 1 is a top plan view of the conveyor system and attached belt lubricating apparatus embodying the present invention;

Fig. 2 is a side elevation of a conveyor system and shows associated therewith partly in vertical section approximately along the lines 2—2 of Fig. 1, a belt lubricating apparatus embodying the present invention;

Fig. 3 is a vertical section of the conveyor system and attached belt lubricating apparatus taken approximately along lines 3—3 of Fig. 2, but shown on a larger scale;

Fig. 4 is a section of the lubricant supply tank and shows a lubricating drum in said tank and the features by which the amount of lubricant transferred and applied to the conveyor belt through said drum is adjusted;

Fig. 5 is a detail enlargement of the drum wiping features shown in Fig. 4;

Fig. 6 is a radial section of one form of lubricating drum embodying the present invention;

Fig. 7 is a partial radial section of the lubricating drum, but shown in connection with a sleeve attachment for the purpose to be made apparent; and Fig. 8 is a radial section of another form of lubricating drum embodying the present invention.

Referring to the drawings, the belt lubricating apparatus is shown applied to a conveyor system for transporting bottles from one operating station to another, until the bottles are finally packaged. However, it must be understood, that as far as certain aspects of the invention are concerned, this lubricating apparatus may be applied to any continuously operating conveyor system in which articles are moved from station to station and are interrupted in their movement at these stations to permit the necessary operations to be performed thereon.

The conveyor system is shown of the conventional type comprising an endless sprocket chain 10 (Figs. 1, 2 and 3) passing over terminal sprocket wheels 11 and carrying an endless belt 12 of the articulated type with substantially horizontal upper and lower runs or flights. This belt 12 comprises a series of oblong rectangular metal slats 13 hinged together by links 14. These links 14 are pivotally connected at their ends to lug extensions 15 (Fig. 6) on the inner faces of the slats 13 and with said lug extensions form the sprocket chain 10.

The frame structure supporting the conveyor system is shown comprising a pair of terminal stanchions 16 to which the bearings for the sprocket wheels 11 are secured. Horizontal tracks 17 shown in the form of angle irons are secured to the stanchions 16 along the sides of the upper run of the belt 12 and have horizontal flanges 18 serving as runways to support said belt run against excessive sagging due to the weight of the bottles A thereon. A pair of rails or guards 20 secured to the stanchions 16 and to the vertical flanges of the tracks 17 guard and guide the bottles along the center line of the belt 12 as they are moved from station to station by said belt.

When the conveyor system is in operation, the belt 12 travels continuously at predetermined speed carrying the bottles with it. At different stations where operations are performed on the bottles, their movements are interrupted, thereby causing the belt 12 to slip under the bottles. To permit the belt 12 to slide freely underneath the bottles without excessive wear, it is necessary to constantly lubricate the belt.

The belt lubricating apparatus of the present invention comprises in general a liquid soap or other suitable liquid lubricant reservoir or fountain 25 shown in the form of an inverted bottle, a supply tank 26 into which the neck of the reservoir extends to draw off the lubricant as it is needed, and a rotary applicator 27 in the form of a drum or roller dipping partially into the lubricant in said supply tank and having traction engagement with the lower run of the belt 12 to cause said drum to rotate by the conveying movement of said belt and to carry peripherally thereby a layer of lubricant from the supply tank to said belt.

The supply tank 26 desirably of rectangular shape is located below the lower run of the belt 12 and is desirably attached to the frame structure of the conveyor systems by a pair of upright hangers 30 in the form of angle irons secured to one of the tracks 17 on one side of the belt by bolts or screws 31 and secured to opposite sides of the tank in any suitable manner, as for example by bolts or screws (not shown) or by welding. A third hanger 32 in the form of an upright tie centrally and triangularly arranged with respect to the hangers 30 is connected at its upper end to the other track 17 on the other side of the belt 12 by bolts or screws 33 and is secured at its lower end to one end of the supply tank 26 by welding, screws or bolts. The supply tank 26 thereby hangs from the frame structure of the machine.

For supporting the reservoir 25 in feeding position with respect to the supply tank 26, said tank has a cover 35 seated on one section thereof on one side of the belt 12 and suitably secured to said tank, as for example, by screwed or bolted seam plates (not shown). This cover 35 is in the form of an inverted rectangular dish having an opening 36 to receive the neck of the reservoir 25 and having a gasket 37 around the edge of said opening to seat the shoulders of the inverted reservoir thereon. The height of the cover 35 is such as to space the mouth of the reservoir 25 above the bottom of the supply tank 26 a distance equal to the depth of lubricant desired in said tank. By employing a cover 35 of different height, the depth of lubricant in the supply tank 26 can be correspondingly changed.

With the fountain arrangement as shown, as the lubricant in the supply tank 26 is consumed to a level below the mouth of the reservoir 25, the lubricant feeds out of said reservoir into said supply tank until the lubricant again reaches the level to seal the mouth of said reservoir. The supply tank 26 is thereby automatically kept continuously replenished.

For removably securing the reservoir 25 in feeding position and to permit its easy replacement for refilling purposes, there is provided a support 40 for one side of the reservoir desirably in the form of a strap having an arcuate intermediate section 41 conformably engaging a part of the periphery of the reservoir 25 and having its ends 42 offset and connected to respective hangers 30 by suitable means, as for example, by welding. A band or loop 44 in the form of a bail is provided to maintain the reservoir 25 against the strap 40. This band 44 has its ends pivotally mounted in the respective hangers 30 by offset ends 45 passing with a rotative or swivel fit through holes in said hangers and in the strap ends 42. The band 44 is of spring wire stock and embraces the upper section of the inverted reservoir 25 with enough clearance to permit said band to be resiliently slipped off and on said reservoir, as shown in Fig. 3, when it is required to replace said reservoir for lubricant replenishing purposes.

The lubricant applying structure described can be easily attached to existing conveyor systems without change in said systems or in their supporting frames. When installed, the reservoir 25 will be in substantially full view, so that the operator will be aware of the extent of lubricant supply in said reservoir at all times and can effect the necessary replacement of reservoir 25 before the supply tank 26 runs dry, without interrupting the operation of the conveyor system or the application of lubricant to the belt 12.

The applicator drum 27 is supported on an axle 50 and rotates thereabout in the direction indicated in Fig. 4 by the traction engagement of the belt 12 therewith. In order to adjust the amount of lubricant reaching the belt 12 through the drum 27, the axle 50 is secured in an adjustable bracket 51 comprising a pair of side arms 52 flanking the drum and secured to the ends of the axle in any suitable means, as for example, by screws 53 (Fig. 3). These bracket arms 52 are connected together at one end by a cross member 54 forming with said arms a U-plate made desirably of one piece from sheet material. The bracket 51 is supported for pivotal adjusting movement, and for that purpose, the lower edge of the bracket plate 54 seats in a V-shaped trough 55 formed between a side wall of the supply tank 26 and an angle piece 56 connected to said wall. An adjustment screw 57 passes through a hole 58 in the side wall of the supply tank 26 and at one end has a wire or rod tip 60 passing through a hole in the bracket plate 54 and offset in the form of a hook to anchor said screw to said plate. The screw tip 60 is flat and passes through a rectangular hole in the bracket plate 54 to keep the screw 57 from turning.

A thumb nut 61 threaded on the part of the screw 57 projecting on the outside of the supply tank 26 has a neck 62 with a rounded end bearing against the outside of the adjacent side wall of said supply tank. By manipulating the nut 61, the lubricating drum 27 may be raised between the position shown in full lines in Fig. 4 and the position shown in dot and dash lines. When more lubricant is required, the nut 61 is loosened to permit the drum 27 to sink by gravity deeper into the lubricant bath, the lower belt run having enough sag to follow the downward movement of the drum in continued engagement therewith. More lubricant is thereby transferred from said bath to the belt 12. Conversely, when the nut 61 is tightened, the drum 27 is raised with respect to the lubricant bath and less lubricant is transferred from said bath to the belt 12. By this adjustment, the drum 27 may be brought up entirely out of the lubricant bath and permitted to operate dry. This adjustment may be required, for example, when the belt has become saturated.

The upper edge of the bracket plate 54 desirably extends above the upper edge of the front wall of the supply tank 26, to render this upper plate edge easily visible to the operator. By observing the position of this upper bracket plate edge with respect to the upper edge of the front wall of the supply tank 26, the operator can tell quickly how deeply the drum dips into the lubricant bath. If desired, a scale may be provided along the upper edge of the front wall of the supply tank 26 to facilitate determination of the extent of drum adjustment.

Another adjustment for the lubricant is desirably provided without disturbing the position of the lubricating drum 27, by means of a device 65 (Figs. 4 and 5) located inside the supply tank 26 on the side thereof opposite the bracket plate 54. This adjusting device comprises a wiper 66 of resilient material such as rubber, extending along the full length of the drum 27 or along any desired part thereof. The wiper 66 is secured in a holder 67 mounted on a pivot shaft 68 journalled in a bearing bracket 70 which is fastened to the adjacent side wall of the supply tank 26. This pivot shaft 68 projects through the front wall of the supply tank 26 to the outside thereof and carries a suitable handle 71 on its projecting end.

For maintaining the wiper 66 into or out of operative position, the holder 67 thereof has a hub 72 with a cam configuration 73 under the resilient pressure action of a spring 74. This spring 74 in the form of an angle has one flange connected to the adjacent side wall of the supply tank and its other flange bearing against the cam section 73 of the holder hub 72.

Normally, the wiper 66 is maintained in inactive position, shown in dot and dash lines in Fig. 5, by the spring 74, the working requirements for the lubricant being met by adjustments in the screw 57. However, when the conveyor belt 12 becomes too wet due to some external cause, or for any reason it is necessary to reduce temporarily the lubrication applied to the belt, the wiper 66 may be quickly thrown against the periphery of the drum 27 into operative position, shown in full lines, by manipulation of the handle 71, until such time as it is desired to resume normal operations. The spring 74 maintains the wiper 66 yieldably into this operative drum wiping position.

In handling machinery, such as those for handling bottles, some conveyor belts are subjected to a considerable amount of water, as for example, from the washing operations, or are subjected to a considerable amount of liquid from accidental breakage of bottles. Other conveyor belts, however, as for example near the packaging station, run fairly dry. This condition necessitates different amounts of lubricant for the different belts or for handling any contingency arising in operation. The different adjusting devices described meet the different lubricating requirements.

The metal belt slats 13 when new have their bottle supporting surfaces usually flat. However, in spite of the use of lubricants, a channel 80 (Fig. 6) will eventually be abrasively worn by the bottles across the center parts of the slats 13 longitudinally of the belt 12. If a long solid lubricating drum 27 is used to apply lubricant to the belt 12, the channel 80 on the belt will remain dry and if a short drum is employed, the outer faces of the side sections of the belt will remain dry. It is desirable to apply lubricant to the outer faces of the side belt sections, so that this lubricant will seep to the inner faces of the side belt sections and in turn to the track flanges 18 on which these side belt sections run. These track flanges 18 will thereby become properly lubricated.

To avoid the adverse conditions described, the lubricating drum in all of the forms of the invention shown has different peripheral sections therealong radially and resiliently yieldable relatively by the pressure tractive action of the belt 12 to conform with the contour of the belt in contact therewith. In the form of the invention shown in Figs. 1–6, this feature is embodied in the drum 27 by making said drum of sectionalized construction. To that end, the drum 27 compriss a center section 82 and side sections 83 flanking said center section and resiliently mounted for radial floating action. The center drum section 82 comprises a solid cylindrical rim 84 wide enough to extend into any channel 80 worn on the outer face of the belt 12, a hub 85 embracing the drum axle 50 with a rotative fit and a rigid connecting member 86 shown in the form of a disc or web between said rim and said hub. The hub 85 extends axially beyond the ends of the center rim 84 to mount the side drum sections 83 resiliently thereon, as will be described.

Each of the side drum sections 83 comprises a solid cylindrical rim 87 having an outside diameter corresponding to that of the center rim 84 and wide enough to extend along at least the full width of that side section of the belt 12 extending beyond the corresponding end of the center rim 84. This rim 87 has an inner peripheral flange 90 and the end of the hub 85 nearest thereto has a peripheral flange 91 in the radial plane of said flange 90. A plurality of coil springs 92 (three being shown 120° apart) extend radially between the rim 87 and the hub 85 and at their ends are anchored thereto by hooking arrangements with the flanges 90 and 91. These coil springs 92 tend to maintain the corresponding side drum section 83 in axial registry with the center drum section 82, with the outer peripheries of their rims 84 and 87 extending along a straight line.

While the surface of the belt 12 is straight thereacross, the lower run of said belt resting on the center drum section 82 lines up the other two drum sections 83, causing the lubricant to be applied substantially evenly across the full width of said belt. As the channel 80 is worn in the belt 12, the belt sags into engagement with the rim 84 of the center drum section 82, causing said rim to extend into said channel in belt supporting position and the side drum sections 83 to be depressed radially downwardly against the action of the springs 92, while maintaining engagement with the side sections of the belt, as shown in Fig. 6. These side drum sections 83 rotate with the center drum section 82 and as upper successive peripheral parts of the side drum sections 83 come into engagement with the belt 12, they are depressed thereby radially downwardly. The lubricant is thereby applied substantially evenly across the face of the belt 12 in spite of irregularities therein, as indicated.

The lubricant is applied by the side drum sections 83 on the outer surface of belt 12 along the side portions thereof. On the other hand, the inner surface of the belt 12 is the one which rides along the track flanges 18. However, sufficient lubricant applied by the side drum sections 83 to the side portions of the belt 12 creeps and spreads to the inner surface of the belt and onto the track flanges 18 when the lower run of the lubricated belt reaches the upper flight. The surface of the track flange 18 along which the belt 12 rides is thereby effectively lubricated.

When more lubricant is required than can be picked up from the supply tank 26 by the drum 27 set up as shown in Fig. 6, a sleeve 100 (Fig. 7) of absorbent material having a certain amount of resiliency, as for example spongy rubber is placed around the drum to embrace the three sections thereof. This sleeve 100 picks up lubricant from the path in the supply tank 26 and transfers it to the belt, as shown in Fig. 7. When this sleeve 100 is employed, the springs 92 may be omitted, since the sleeve keeps the outer drum sections 83 in place and serves as a resilient or floating mount, permitting them to yield radially relatively to the center drum section 82 into conformity with the surface of the belt 12.

Another alternative form of belt lubricant rotary applicator 27ª embodying the present invention is shown in Fig. 8. In this form of the invention, the applicator of sectionalized construction comprises a series of hubs 105 in the form of rings arranged axially side by side along a clamping sleeve 106 and arranged into three groups to define a center applicator unit 82ª and side applicator units 83ª separated from said center applicator unit by belt supporting discs 107. Each of these hubs 105 has set therein around the periphery thereof a series of radially extending brush tufts 108 which are made of wire, bristles, hair or similar flexible elastic thread-like material and which are adapted to extend into sweeping contact with the surface of the belt 12 to apply lubricant thereto picked up from the supply tank 26.

The clamping sleeve 106 to which the hubs 105 and discs 107 are secured as a unit embrace the applicator axle 50 with a rotative bearing fit and is shown with a flange or shoulder 110 at one end and a nut 111 threaded on to its other end against the outside hub. This sectionalized demountable structure permits the hubs 105 with attached brush tufts 108 to be removed, replaced or rearranged in accordance with the lubricating conditions desired.

The belt supporting discs 107 are spaced to extend into the channel 80 formed in the belt 12 by abrasive wear. As the belt 12 moves along at a predetermined speed, its friction traction engagement with the discs 107 causes the whole lubricant applicator unit 27ª to rotate about the axle 50 substantially at a corresponding speed. This causes the tufts 108 which have previously dipped into the lubricant bath in the supply tank 26 to move in lubricant applying position with respect to the belt 12. These tufts 108 being flexible and resilient will flex and spread under the compressive action of the belt 12 and will, therefore, automatically conform with the contour of said belt. The lubricant will, therefore, be spread substantially evenly across the belt 12, except in the areas where the discs 107 contact said belt, and even into these areas, the lubricant will spread from the lubricated belt sections.

If it is desired to change the pattern of application of the lubricant to the belt 12, this can be easily done with the arrangement shown in Fig. 8. For example, the length of the different applicator sections 82ª and 83ª can be varied by changing the number of tufted hubs 105 in each section. Moreover, the amount of lubricant applied by each of the applicator sections 82ª and 83ª can be varied by using tufts of different densities for the different applicator sections. For example, it may be desired to apply a heavy coating of lubricant in the channel area of the belt 12 and a thinner coat in the side areas. The tufts 108 in the center applicator section 82ª may, for that purpose, be denser than those in the side applicator sections 83ª to obtain this effect.

The structure of Fig. 8 is not only suitable for cases where the outer surface of the belt 12 may become irregular due to the abrasive wear action of the bottles or other articles thereon, but also to cases where the outer belt surface may be irregular in the first instance for any other reason associated with the function and operation of the system. Under these conditions, application of the lubricant across the belt 12 to the desired extent is assured irrespective of any such irregularities.

The arrangement of Fig. 8 can be made to replace the structure of Figs. 6 and 7, by simply slipping off the drum structure shown in said latter figures from the axle 50 and mounting the tufted hub structure of Fig. 8 thereon in its place.

While the invention has been described with particular reference to specific embodiments, it is to be understood that it is not to be limited thereto, but is to be construed broadly and restricted solely by the scope of the appended claims.

What is claimed is:

1. In a device for lubricating the supporting surface of a conveyor belt, the combination comprising a supply tank for liquid lubricant, a rotary lubricant applicator in said tank adapted to dip into the lubricant bath in said tank and to tractively engage said belt, a wiper pivotally mounted on one side of said tank and movable selectively into or out of wiping engagement with said applicator into either of two positions, means automatically operable when said wiper is in position between said two positions for moving said wiper in either of said two positions, and means automatically operable when said wiper reaches either of said two positions for releasably holding said wiper in either of said two positions.

2. In a device for lubricating the supporting surface of a conveyor belt, the combination as described in claim 1, wherein said wiper moving means and said wiper holding means comprises spring means, and cam means connected for pivotal movement with said wiper about the pivot axis thereof and engaging said spring means to releasably hold said wiper selectively into and out of operative position.

3. In a device for lubricating the supporting surface of an endless conveyor belt, a rotary lubricant applicator for peripherally picking up liquid lubricant from a supply tank into which said applicator is adapted to extend and for applying the picked-up liquid lubricant to said surface comprising a plurality of peripheral sections extending alongside of each other and adapted to engage said surface of the belt, said sections being relatively and elastically yieldable radially to a substantial extent to conform separately with irregularities in said surface.

4. In a device for lubricating the supporting surface of an endless conveyor belt, a rotary lubricant applicator for peripherally picking up liquid lubricant from a supply tank into which said applicator is adapted to extend and for applying the picked-up liquid lubricant to said surface comprising a plurality of separate rim sections extending alongside of each other and adapted to be pressed by said surface, and means elastically supporting at least one of said rim sections for movement radially and relatively to the other rim sections and to a substantial extent to conform said rim sections separately with the irregularities in said surface.

5. In a device for lubricating the supporting surface of an endless conveyor belt, a drum for applying liquid lubricant to said surface, comprising three separate rim sections of rigid material extending alongside of each other and adapted to be pressed by said surface, and means elastically supporting the outside rim sections for movement radially and relatively to the center rim section to conform said rim sections to the irregularities in said surface.

6. In a device for lubricating the supporting surface of an endless conveyor belt, a drum for applying liquid lubricant to said surface, comprising a plurality of separate rim sections of rigid material extending alongside of each other and adapted to tractively engage the said surface, and spring means mounting at least one of said rim sections for resilient radial floating action with respect to the other rim sections.

7. In a device for lubricating the supporting surface of an endless conveyor belt, a drum for applying liquid lubricant to said surface, comprising three separate rim sections of rigid material extending alongside of each other and adapted to be pressed by said surface, a hub, means rigidly connecting the center rim section to said hub, and coil springs connecting the outside rim sections to said hub to afford a resilient floating mount for said outside rim sections.

8. In a device for lubricating the supporting surface of an endless conveyor belt, a drum for applying liquid lubricant to said surface, comprising a plurality of separate rim sections of rigid material extending alongside of each other, and a sleeve of absorbent resilient material embracing said rim sections for engagement with said surface and permitting said rim sections to yield radially under the pressure action of said surface.

9. In a device for lubricating the supporting surface of an endless conveyor belt, a rotary lubricant applicator for applying liquid lubricant to said belt comprising a hub unit, and a series of brush tufts around said hub unit set into said hub unit and extending radially therefrom for engagement with said surface.

10. In a device for lubricating the supporting surface of an endless conveyor belt, a rotary lubricant applicator for applying liquid lubricant to said belt comprising a hub unit, a series of brush tufts around said hub unit set into said hub unit and extending radially therefrom for engagement with said surface, and one or more circular discs of rigid material connected to said hub unit and adapted to tractively and peripherally engage said surface.

11. In a device for lubricating the supporting surface of an endless conveyor belt, a rotary lubricant applicator for applying liquid lubricant to said belt comprising a series of hub elements arranged alongside of each other, side by side, means detachably connecting said elements together into a single rotative unit, a series of brush tufts around each of said hub elements set into said hub element and extending radially therefrom for engagement with said surface, and one or more circular discs of rigid material removably connected to said hub unit and adapted to tractively and peripherally engage said surface.

12. A device for lubricating the supporting surface of an endless conveyor belt, comprising a liquid lubricant supply tank, and a rotary lubricant applicator in said tank adapted to dip into the lubricant bath in said tank and to engage the surface of said belt, to effect thereby transfer of lubricant from said supply tank to said belt surface, said lubricant applicator comprising a plurality of peripheral sections extending alongside of each other and adapted to engage said belt surface, said sections being relatively and elastically yieldable radially to a substantial extent to conform separately with irregularities in said surface.

13. In a device for lubricating the supporting surface of the lower run of an endless conveyor belt, the combination comprising a supply tank for liquid lubricant, a rotary lubricant applicator in said tank adapted to dip into the lubricant bath in said tank and to tractively engage the lower run of said belt, and means for adjusting the vertical position of said applicator in said tank to adjust the extent to which said applicator sinks into the bath in said tank and comprising a U-shaped bracket of sheet material having side arms for rotatively supporting said applicator and a cross member in the form of an upwardly extending plate joining said arms, a V-trough on the side of said tank pivotally receiving the lower edge of said cross member, and means for adjusting the angular position of said bracket about said V-trough and comprising a screw connected at one end to said cross member and held against rotation, said screw projecting through a wall of said supply tank to the outside thereof, and a nut threaded onto said screw on the projecting part thereof and bearing against said tank wall.

WILLIAM J. DOBKIN.

(References on following page)

References Cited in the file of this patent

UNITED STATES PATENTS

| Number | Name | Date |
|---|---|---|
| 1,433,939 | Cordley | Oct. 31, 1922 |
| 1,679,717 | Greer | Aug. 7, 1928 |
| 1,741,211 | Vallier | Dec. 31, 1929 |
| 1,832,374 | Forby et al. | Nov. 17, 1931 |
| 1,967,751 | Goerlich | July 24, 1934 |
| 2,357,679 | Moench | Sept. 5, 1944 |
| 2,367,354 | Kanter | Jan. 16, 1945 |
| 2,369,557 | Gettleman | Feb. 13, 1945 |
| 2,465,941 | Steen | Mar. 29, 1949 |
| 2,516,757 | Davidson | July 25, 1950 |
| 2,541,301 | Sissler | Feb. 13, 1951 |
| 2,572,047 | Neal | Oct. 23, 1951 |
| 2,604,199 | Govan | July 22, 1952 |